US008531976B2

(12) United States Patent
Vasseur et al.

(10) Patent No.: US 8,531,976 B2
(45) Date of Patent: Sep. 10, 2013

(54) LOCATING TUNNEL FAILURE BASED ON NEXT-NEXT HOP CONNECTIVITY IN A COMPUTER NETWORK

(75) Inventors: Jean-Philippe Vasseur, Dunstable, MA (US); Danny Prairie, Kanata (CA)

(73) Assignee: Cisco Technology, Inc., San Jose, CA (US)

(*) Notice: Subject to any disclaimer, the term of this patent is extended or adjusted under 35 U.S.C. 154(b) by 715 days.

(21) Appl. No.: 12/044,620

(22) Filed: Mar. 7, 2008

(65) Prior Publication Data

US 2009/0225652 A1    Sep. 10, 2009

(51) Int. Cl.
*H04J 1/16* (2006.01)

(52) U.S. Cl.
USPC .......................................... 370/248

(58) Field of Classification Search
USPC ................... 370/217–222, 229–250
See application file for complete search history.

(56) References Cited

U.S. PATENT DOCUMENTS

| 6,751,190 | B1 | 6/2004 | Swallow |
| 6,778,492 | B2 | 8/2004 | Charny et al. |
| 7,120,151 | B1 | 10/2006 | Ginjpalli et al. |
| 7,230,913 | B1 | 6/2007 | Vasseur et al. |
| 7,343,423 | B2 | 3/2008 | Goguen et al. |
| 7,345,994 | B2 | 3/2008 | Sivabalan et al. |
| 7,370,119 | B2 | 5/2008 | Provine et al. |
| 7,852,778 | B1* | 12/2010 | Kompella ............. 370/248 |
| 2002/0093954 | A1* | 7/2002 | Weil et al. ............. 370/389 |
| 2003/0117950 | A1* | 6/2003 | Huang ............. 370/220 |
| 2003/0126287 | A1* | 7/2003 | Charny et al. ............. 709/239 |
| 2003/0233595 | A1 | 12/2003 | Charny et al. |
| 2004/0004938 | A1* | 1/2004 | Buddhikot et al. ............. 370/238 |
| 2004/0109687 | A1* | 6/2004 | Park et al. ............. 398/57 |
| 2005/0013242 | A1* | 1/2005 | Chen et al. ............. 370/228 |
| 2005/0281192 | A1* | 12/2005 | Nadeau et al. ............. 370/217 |
| 2006/0159009 | A1* | 7/2006 | Kim et al. ............. 370/216 |
| 2006/0215548 | A1* | 9/2006 | Le Faucheur et al. ............. 370/228 |
| 2006/0250948 | A1 | 11/2006 | Zamfir et al. |
| 2008/0037436 | A1* | 2/2008 | Liu ............. 370/250 |
| 2009/0080326 | A1* | 3/2009 | Xu ............. 370/225 |
| 2009/0292943 | A1* | 11/2009 | Hanif et al. ............. 714/4 |

* cited by examiner

*Primary Examiner* — Kwang B Yao
*Assistant Examiner* — Juvena Loo
(74) *Attorney, Agent, or Firm* — Cesari and McKenna, LLP

(57) ABSTRACT

In one embodiment, a trigger is signaled to protect a tunnel from a head-end node to one or more tail-end nodes in a computer network via one or more intermediate nodes along the tunnel. One or more receiving nodes along the tunnel receive the trigger, and in response, establish a tunnel connectivity verification session from the receiving node to a corresponding downstream next-next-hop (NNHOP) node along the tunnel. Illustratively, the head-end node may thus recompute a new tunnel path excluding a path segment corresponding to a particular failed tunnel connectivity verification session.

26 Claims, 8 Drawing Sheets

LOCATING TUNNEL FAILURE BASED ON NEXT-NEXT HOP CONNECTIVITY IN A COMPUTER NETWORK

TECHNICAL FIELD

The present disclosure relates generally to computer networks, and, more particularly, to failure protection of tunnels in computer networks.

BACKGROUND

In order to protect traffic services within a computer network, service providers often deploy one or more "fast reroute" (FRR) techniques in order to quickly respond to link, node, and SRLG (shared risk link group) failures. For example, Multi-Protocol Label Switching (MPLS) provides for Traffic Engineering (MPLS-TE) techniques that may be used to offer FRR protection. In order for FRR to be effective, failures must be detected quickly. For instance, link failures may be detected using various connectivity verification protocols, such as hardware based alarms (e.g., synchronous optical network, "SONET", or synchronous digital hierarchy, "SDH" alarms) or by using a message-based (e.g., "hello" packet) protocol such as bi-directional forwarding detection (BFD).

Those skilled in the art will appreciate that node failures are undoubtedly more difficult to detect than link failures, especially when the node failure does not imply a failure of its local links. In particular, certain types of node failures cannot be detected using local failure detection techniques for which an end-to-end hello-based mechanism is required, such as dataplane issues (e.g., forwarding tables having a corrupted entry, backplane issues, etc.) of traffic forwarded on tunnels available through MPLS TE (e.g., label switched paths, or LSPs). These types of node failures may only be detected if hello packets are sent onto the tunnel itself, conventionally over a connectivity verification protocol session (e.g., BFD session) established end-to-end between a head-end node and a tail-end node of the tunnel. However, when an end-to-end tunnel connectivity verification protocol session learns of a failure, the entire end-to-end topology of the tunnel is removed or "pruned" due to the inability to more precisely locate the failure.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
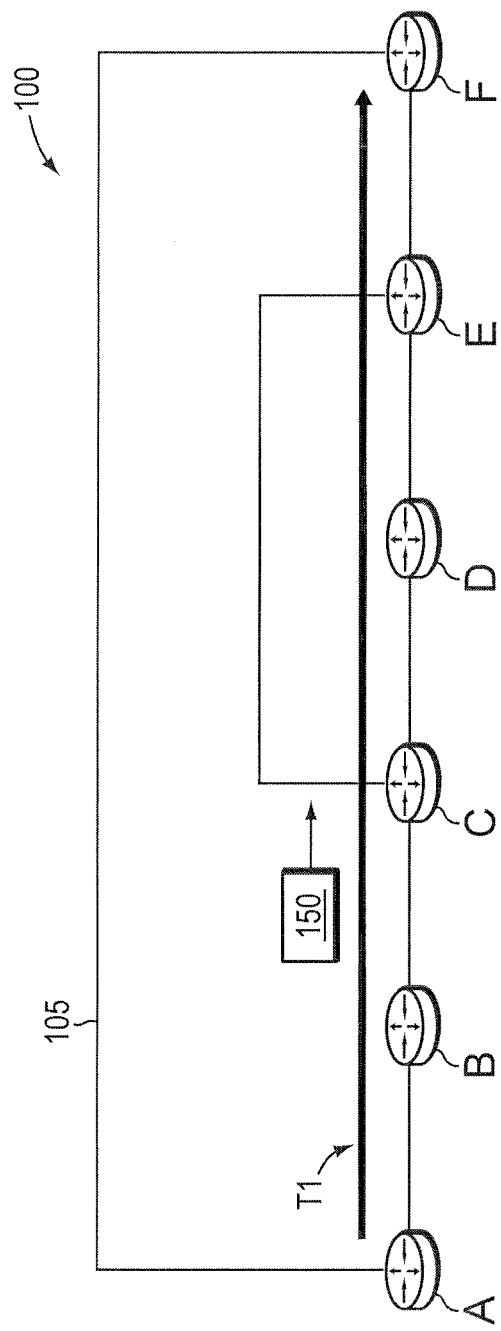
FIG. 1 illustrates an example computer network.

According to embodiments of the disclosure, a trigger is signaled to protect a tunnel from a head-end node to one or more tail-end nodes of a computer network via one or more intermediate nodes along the tunnel. One or more receiving nodes along the tunnel receive the trigger, and in response, establish a tunnel connectivity verification session from the receiving node to a corresponding downstream next-next-hop (NNHOP) node along the tunnel.

Also, according to embodiments of the disclosure, one or more NNHOP backup tunnels may be established from receiving nodes to corresponding NNHOPs, and in response to failure of the tunnel connectivity verification session, the receiving nodes may reroute traffic of the tunnel onto the NNHOP backup tunnel and notify the head-end node of the failure. Further, the head-end node may recompute a new tunnel path excluding a path segment corresponding to the particular failed tunnel connectivity verification session.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices, such as nodes A-F interconnected by links as shown. Those skilled in the art will understand that any number of nodes, devices, links, etc. may be used in the computer network, and that the view shown herein is for simplicity. For instance, nodes A-F are interconnected by links as shown, however, certain links may comprise additional nodes, not shown for clarity of illustration. Those skilled in the art will also understand that while the embodiments described herein is described generally, it may apply to any network configuration within an Autonomous System (AS) or area, or throughout multiple ASes or areas, etc.

Data packets (traffic) 150 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc., or, in accordance with one or more embodiments described herein, Multi-Protocol Label Switching (MPLS) along a tunnel (e.g., T1).

Figure 2:
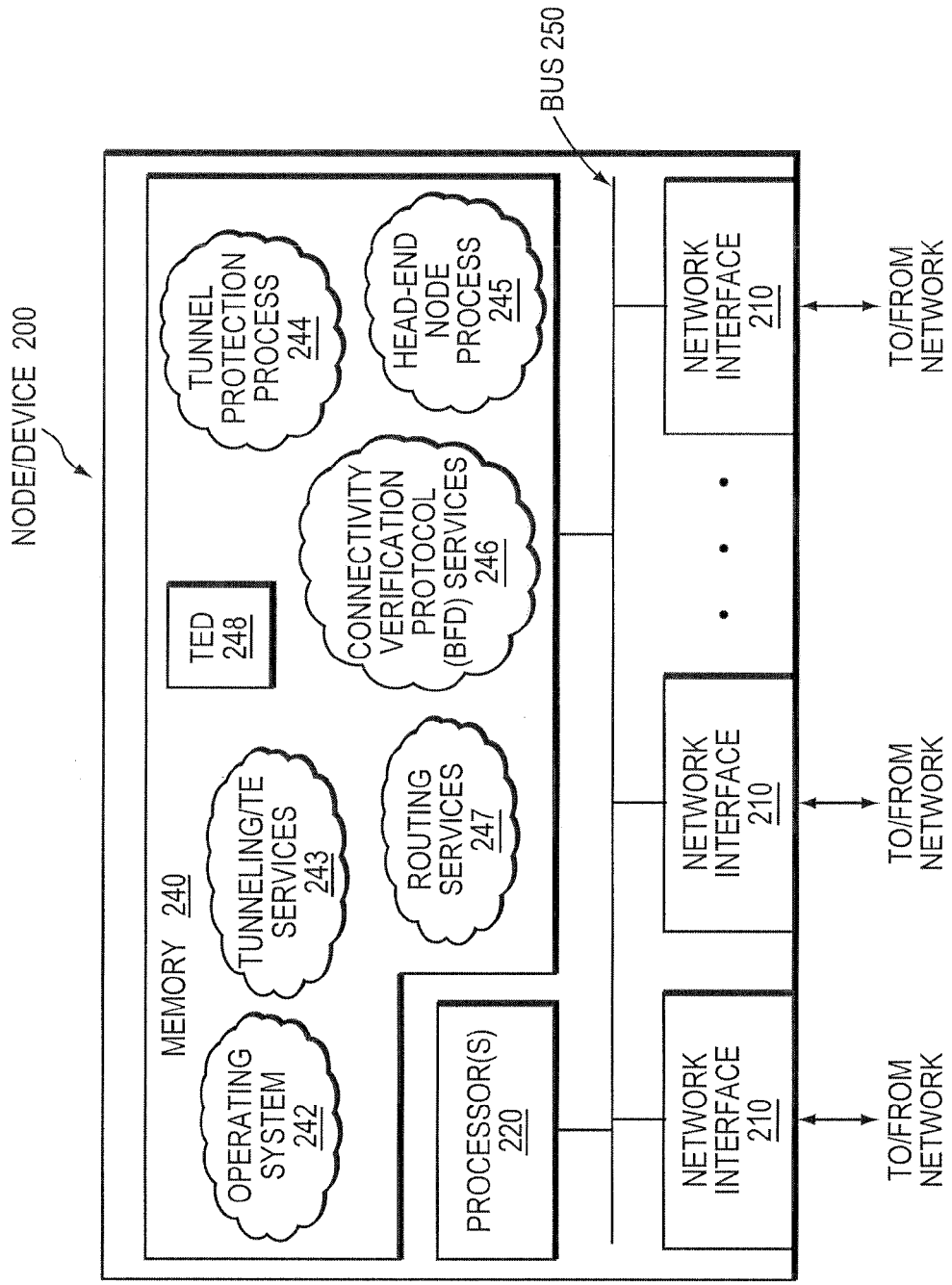
FIG. 2 illustrates an example network device/node.

FIG. 2 is a schematic block diagram of an example node/device 200 that may be advantageously used with one or more embodiments described herein, e.g., as a head-end node (A), tail-end node (F), and/or intermediate node (B-E). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), MPLS, etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a Traffic Engineering database (TED) 248. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 247 and tunneling/TE services 243, illustratively including (or cooperating with) head-end node process 245 tunnel protection process 244, and connectivity verification process 246, as described herein. It will be apparent to those skilled in the art that other processor and memory types, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown).

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, tunneling/TE services 243 contain computer executable instructions for implementing tunnels, such as through RSVP TE and processing RSVP messages in accordance with the embodiments described herein. Further, head-end node process 245 contains computer executable instructions for tunneling operations specific to head-end node processing, as may be understood by those skilled in the art and additionally as further described herein. TED 248 may be illustratively resident in memory 240 and used to store TE information provided by the routing protocols, such as IGP, BGP, and/or RSVP (e.g., with TE extensions). The TED may be illustratively maintained and managed by tunneling/TE services 243.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first). Illustratively, with reference again to FIG. 1, head-end node A may have an established tunnel T1 along the path as shown (A-F) to tail-end node F.

In particular, in accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver establishes the tunnel between the sender and receiver by responding to the sender's Path message with a reservation request (Resv) message. The reservation request message travels upstream hop-by-hop along the flow from the receiver to the sender (i.e., along intermediate nodes). The reservation request message contains information that is used by intermediate nodes along the flow to reserve resources for the data flow between the sender and the receiver, to confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 3:
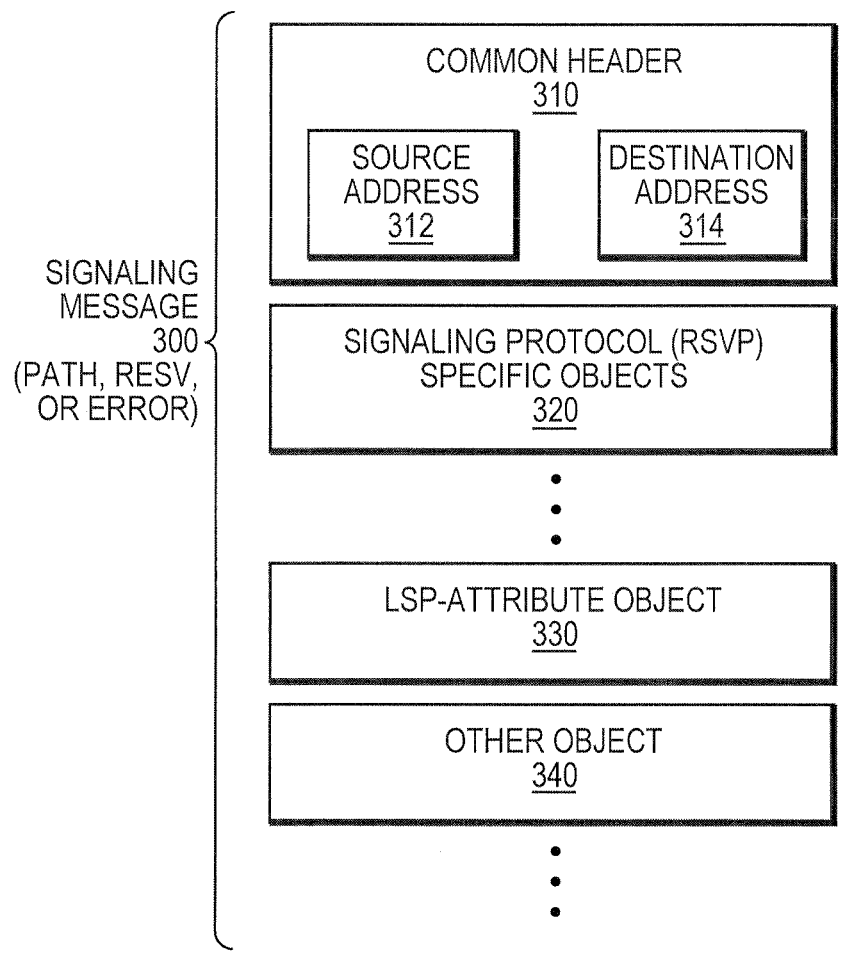
FIG. 3 illustrates an example signaling message.

FIG. 3 is a schematic block diagram of portions of a signaling message 300 (e.g., RSVP message, such as Path, Resv or Error) that may be advantageously used with the present invention. Message 300 contains, inter alia, a common header 310, one or more signaling protocol specific objects 320, such as an LSP-Attribute object 330, as well as one or more other objects 340, described below, e.g., formatted as one or more variable length fields 400, which each have a specific type (or code), length, and value (TLV) as described further herein. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, etc. A Resv message, on the other hand, may have specific objects 320 for a label object, session object, filter spec object, etc. Also, Error messages 300 (e.g., PathErr or ResvErr), may also have specific objects 320, such as for defining the type of error, etc. Various flags and/or TLVs 400 may also be contained within the objects 320-340, as will be understood by those skilled in the art.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
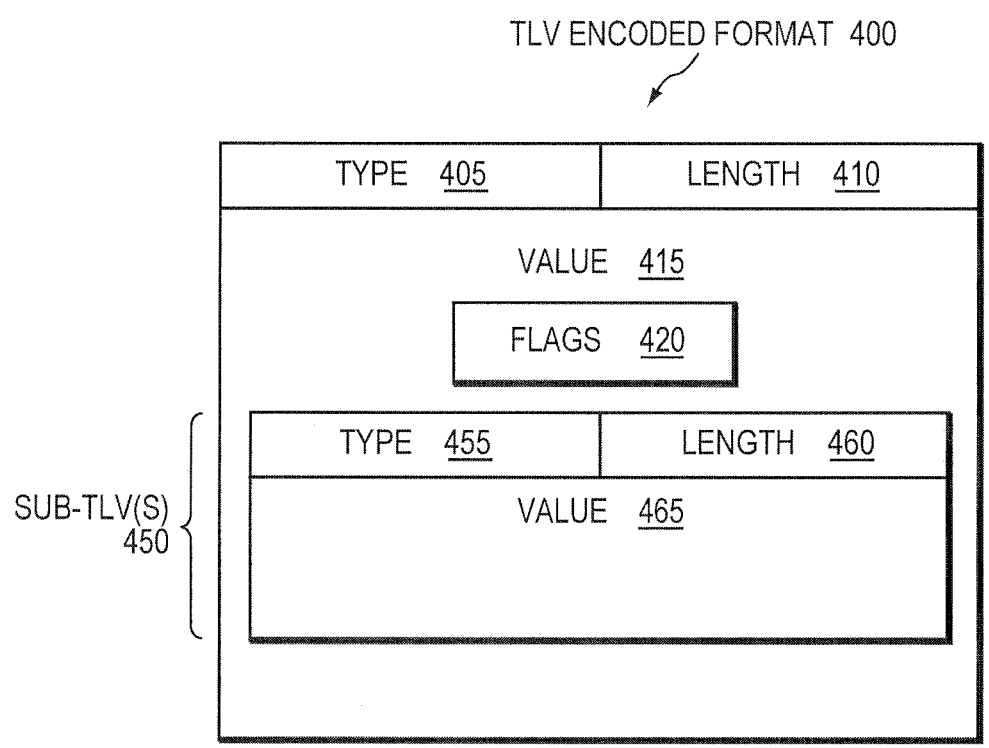
FIG. 4 illustrates an example variable length field.

FIG. 4 is a schematic block diagram illustrating the TLV encoded format 400 that may be advantageously used with the one or more embodiments described herein. The TLV 400 may be used for a variable length field contained in a message (e.g., an RSVP message 300), or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein.

It should be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to produce route record objects (RROs) and/or explicit route objects (EROs) contained in signaling messages for a tunnel that may be used to store, e.g., hop-by-hop information about the tunnels (e.g., a record of the path having nodes A-F).

Because of the increasing need for faster network response time and convergence in computer networks, administrators often require the ability of individual network devices to quickly detect failures. Connectivity verification protocols, such as Bidirectional Forwarding Detection (BFD), may provide rapid failure detection times between devices, while maintaining low overhead. BFD verifies connectivity between two devices based on rapid transmission of BFD control packets between the two devices. Notably, BFD also provides a single, standardized method of link/device/protocol failure detection at any protocol layer and over any media. Generally, BFD sessions may be established between network devices or nodes (e.g., routers) in order to monitor connectivity of the nodes over a particular link between the nodes.

Connectivity verification protocol services (or process 246) contain computer executable instructions executed by each processor 220 to verify connectivity between two systems/devices. Illustratively, a connectivity verification protocol that may be used is BFD, such that services 246 may verify connectivity between two systems/devices, depending on the transmission of BFD control packets ("BFD messages") between the two devices. (Notably, as used herein, the terms/phrases "BFD" and "connectivity verification protocol" may be used interchangeably herein; however, BFD is merely one example of a connectivity verification protocol, and is not meant to be limiting on the scope of the present disclosure.)

Assume, for example, that a first device (a monitoring node) wishes to verify its connectivity to a second device (a monitored node) using BFD. The first device may transmit a BFD message to the second device, and may verify connectivity based on a response/non-response from the second device, e.g., within a particular time period. If the first device does not receive a response from the second device within the time period, the first device determines that the BFD session has failed or "timed out" (or is "down"), accordingly.

Figure 5:
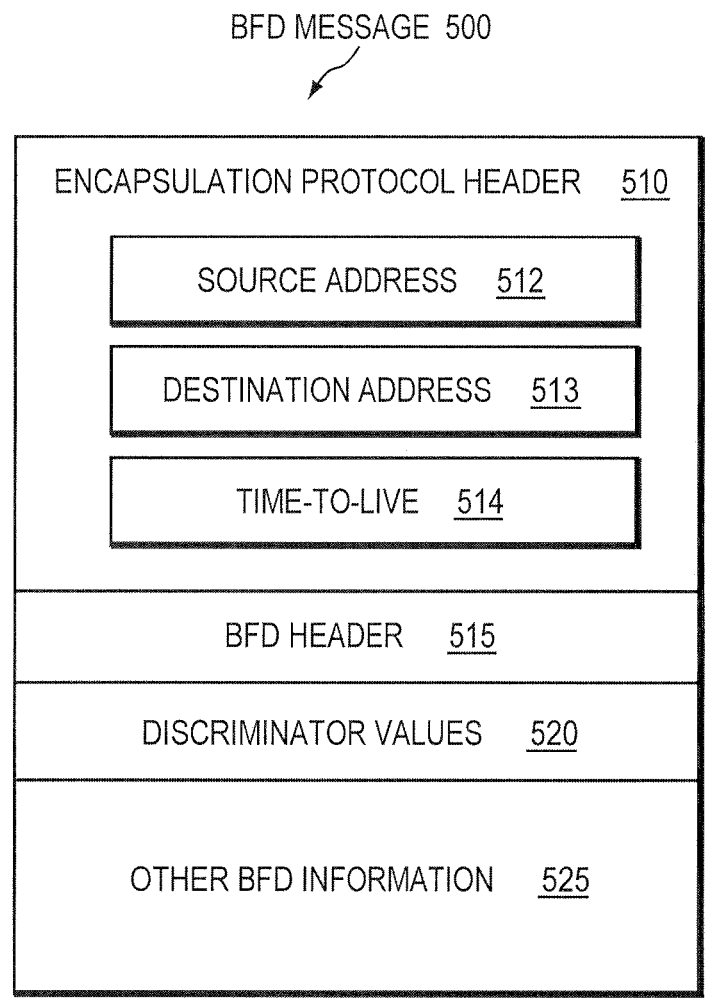
FIG. 5 illustrates an example connectivity verification protocol message.

FIG. 5 illustrates an example connectivity verification protocol message ("BFD message") 500 that may be transmitted by BFD capable devices 200. Illustratively, the BFD message 500 is a generic BFD message, and those skilled in the art will understand that other BFD messages (e.g., Echo messages) may comprise other fields accordingly. The message 500 includes an encapsulation protocol header 510, an optional BFD header field 515, a discriminator values (e.g., a "My Discriminator" and/or "Your Discriminator) field 520, and a field for other BFD information 525. As those skilled in the art will understand, BFD messages 500 are sent in an encapsulation appropriate to the environment (e.g., TCP/IP, MPLS, etc.). Thus, the encapsulation protocol header 510 contains information standard for the specific type of encapsulation. A source address 512 and destination address 513 within the header may be network addresses for the sending device and receiving device, respectively. Also, as described herein, a time-to-live (TTL) field 514 may also be contained within the header 510.

The BFD header field 515 may comprise standard BFD header information, such as, e.g., a BFD version number, a message length, certain flags, etc., or other information (more or less) as configured by the sending device. Because a sending device may have more than one BFD session established at a time (e.g., with the same receiving device, or other receiving devices), the discriminator fields 520 contain sufficient information to demultiplex the BFD messages 500 to the correct BFD session once it has been received by the receiving device. An example discriminator may be an opaque value that identifies each BFD session, and which is unique among all BFD sessions at each device. For instance, a "My Discriminator" value is unique at the sending device, while a "Your Discriminator" value is unique at the receiving device. Also, the other BFD information field 525 may be used according to the BFD protocol, such as, e.g., timer interval values, authentication, etc. Notably, BFD may operate across any number of links and at any protocol layer, e.g., Physical, Data Link, Network, Virtual, etc., as will be understood by those skilled in the art. Conventionally, if a BFD message 500 (e.g., Echo message) is not returned to the first device, the session is declared to be down by the first device. When a failure is detected (of the link or a remote node/device), interested applications, such as routing protocols, etc., may take appropriate action, e.g., removing any reference to the adjacency from routing/forwarding tables, and route traffic around the point of failure.

As noted above, fast reroute (FRR) techniques may be employed to quickly detect and respond to failures of network elements. Due to the use of tunnels (e.g., MPLS TE-LSPs), certain types of failures cannot be detected using local failure detection techniques. For example, various dataplane issues (e.g., forwarding tables having a corrupted entry, backplane issues, etc.) of traffic forwarded on tunnels may only be detected if a connectivity verification protocol session is established along the tunnel. Conventionally, such sessions (e.g., BFD sessions) are established end-to-end between a head-end node (e.g., node A) and a tail-end node (e.g., node F) of the tunnel (e.g., T1).

Further, one problem with end-to-end tunnel connectivity verification protocol sessions is that in response to learning of a failure, head-end nodes typically remove or "prune" the failed network elements from the network topology to recompute a new path based on the failed session (e.g., prior to a delayed receipt of a network topology change). While not particularly a problem for non-tunneled sessions, end-to-end tunneled connectivity verification protocol sessions (e.g., to detect forwarding table corruption, etc.) face the issue of pruning the entire end-to-end topology of the tunnel due to the end-to-end session's failure. In many cases, pruning the entire tunnel path may lead to sub-optimal recomputed paths or no path at all considering the number of network elements that have to be pruned since the end-to-end session failure does not provide any information about the failure location along the tunnel.

For example, assume that a corrupted forwarding table entry occurs on node D of tunnel T1, and that an end-to-end BFD session has been established between head-end node A and tail-end node F. Currently, the resultant failure of the end-to-end session causes the head-end node to prune the entire path A-B-C-D-E-F (e.g., from the TED 248) prior to recomputing an alternate path, as opposed to simply the failed segment (node D, and thus also links C-D and D-E). This pruning, which is excessive without knowing the location of the failure, may lead to a recomputed tunnel over path 105 of FIG. 1, which may be a sub-optimal (or otherwise unacceptable) path.

Locating Tunnel Failures

According to embodiments of the disclosure, a trigger is signaled to protect a tunnel from a head-end node to one or more tail-end nodes of a computer network via one or more intermediate nodes along the tunnel. One or more receiving nodes along the tunnel receive the trigger, and in response, establish a tunnel connectivity verification session from the receiving node to a corresponding downstream next-next-hop (NNHOP) node along the tunnel. Also, according to embodiments of the disclosure, one or more NNHOP backup tunnels may be established from receiving nodes to corresponding NNHOPs, and in response to failure of the tunnel connectivity verification session, the receiving nodes may reroute traffic of the tunnel onto the NNHOP backup tunnel and notify the head-end node of the failure. Further, the head-end node may recompute a new tunnel path excluding a path segment corresponding to the particular failed tunnel connectivity verification session.

In an illustrative embodiment, tunnel protection process/service 244 contains computer executable instructions executed by each processor 220 of the network device 200 to perform functions related to the novel techniques described herein, e.g., in cooperation with tunneling/TE services 243, connectivity verification process 246, and, where appropriate, head-end node process 245.

Operationally, one or more embodiments described herein consist of dynamically activating a connectivity verification protocol session (e.g., BFD session) between each hop along a tunnel path and its next-next hop (NNHOP) for each primary tunnel for which a fast data forwarding failure mechanism (e.g., FRR) is requested. For example, because such end-to-end failure detection may only be required for certain tunnels, e.g., critical tunnels, emergency use tunnels, etc., a new LSP-ATTRIBUTES object 330 value (e.g., TLV 400) may be defined and carried within an RSVP message 300 (e.g., Path or Resv) that is used to signal a trigger to protect the corresponding tunnel. Such a signal may be conveyed during initial establishment of the tunnel, or during subsequent messages 300 exchanged along nodes of the tunnel after the tunnel has already been established. (Notably, other signals may be used to trigger the protection of the tunnel, such as various proprietary signaling messages or specific protection messages, and use of RSVP messages 300 to convey the trigger is merely illustrative.) For instance, assume that head-end node A triggers protection of tunnel T1 toward tail-end node F using signaling messages 300.

Upon receiving the message 300 (e.g., an RSVP message comprising the newly defined TLV 400), each receiving (or "protecting") node/hop along the tunnel's path may dynamically trigger a tunnel connectivity verification protocol session (e.g., BFD session) with its downstream NNHOP along the path. For example, each node may determine its corresponding downstream NNHOP by examining an explicit route object (ERO) of a Path message 300, or route record object (RRO) of a Resv message 300.

Notably, as may be appreciated by those skilled in the art, operating a BFD session over a tunnel is different from operating BFD over single hop physical interfaces. Particularly this is so because the BFD's "peer" may be several hops away, encapsulated by a tunneling protocol using a "bootstrapping" procedure (e.g., as defined in an Internet Draft, entitled, BFD for MPLS LSPs [draft-ietf-bfd-mpls-04.txt] by Aggarwal et al.). Described therein, this Internet Draft calls for BFD to operate across the entire length of the tunnel (LSP), i.e., end-to-end. According to embodiments described herein, however, BFD sessions may be established not only end-to-end, but between any given nodes of the tunnel.

In particular, the technique described herein injects a BFD message 500 (or an "LSP Ping" packet) from each protecting/receiving node along the tunnel to a corresponding downstream NNHOP. Specifically, one illustrative technique that may be used to allow for injected connectivity messages 500 to be destined mid-tunnel for a NNHOP is to use a time-to-live (TTL) value 514 within the injected message. For instance, using a TTL value of "2", as will be appreciated by those skilled in the art, will allow the injected message 500 to traverse the tunnel T1 to a second downstream node, i.e., a NNHOP. That is, as each node receives the message 500, the TTL value is decremented before forwarding the message to a next downstream node. In this manner, the next-hop node decrements the value to "1", and forwards the message to the NNHOP. The NNHOP decrements the value to "0", and responds to the source of the message (the originator) with a resultant error, which, if reaching the source, indicates that the message 500 reached its NNHOP destination. The connectivity verification message (BFD message) 500 implementation is thus relaxed from end-to-end session implementation to allow the transmissions and reception of messages from intermediate nodes (mid-point routers). (Also, intermediate nodes may each assign a unique BFD discriminator value 520, as mentioned above, to correlate returned messages with a particular session.)

Figure 6:
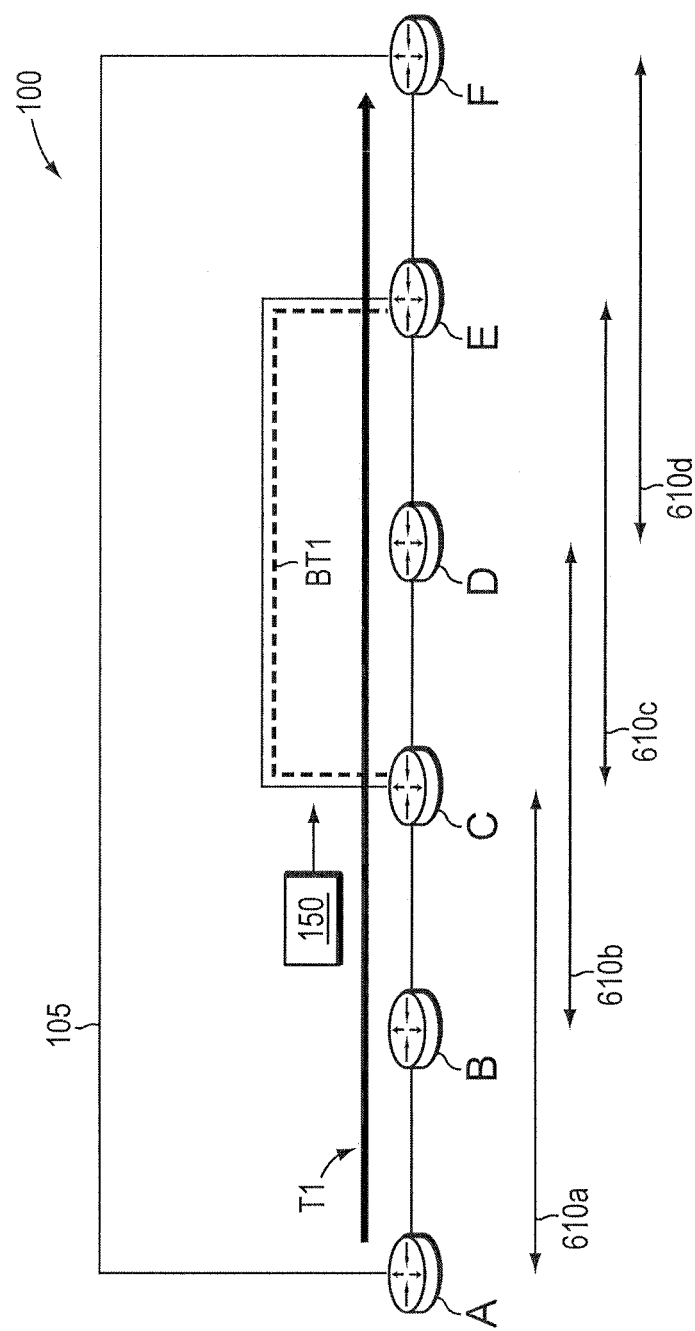
FIG. 6 illustrates an example computer network having connectivity verification protocol sessions.

As an example, FIG. 6 illustrates the example computer network 100 of FIG. 1 with established connectivity verification protocol sessions 610a-d. Illustratively, assume that the trigger has been received by each of the nodes along the tunnel T1, namely, nodes A-F. Head-end node A may establish a connectivity verification protocol session 610a to its NNHOP node C, intermediate nodes B and C may respectively establish sessions 610b and 610c to their corresponding NNHOPs node D and node E, respectively. Also, intermediate node D may establish a session 610d with its NNHOP, tail-end node F. Notably, the penultimate hop node E and tail-end node F need not establish downstream tunnel connectivity verification sessions, since they each have no NNHOP on the tunnel T1. (Moreover, in the event that the tunnel splits toward a plurality of tail-end nodes at a particular receiving node, e.g., for point-to-multipoint or "P2MP" tunnels, that particular receiving node may establish a tunnel connectivity verification session to a corresponding NNHOP on each split toward a corresponding tail-end node, e.g., with corresponding discriminator values 520.)

In addition, each protecting node (e.g., A-D) may establish a NNHOP backup tunnel to its corresponding NNHOP for FRR (next-hop node protection), as may be appreciated by those skilled in the art. For example, backup tunnel BT1 from node C to node E (to protect against failure of node D) may be established on an alternate path than T1. (Note that only one backup tunnel BT1 and one alternate path is shown for simplicity of discussion, and that each other protecting node may have an alternate path available for a backup tunnel, accordingly.)

Once the connectivity verification protocol sessions (and NNHOP backup tunnels) are established, the protecting nodes A-D may monitor their respective sessions 610a-d for a failure, e.g., an unreturned message 500. When a NNHOP BFD session 610 fails, the protecting node (a "point of local repair," or "PLR") triggers FRR thus rerouting traffic 150 from the primary tunnel T1 onto its corresponding NNHOP backup tunnel, and notifies the head-end node A of the failure. Specifically, the protecting node may send a Path Error message 300 (e.g., with a new code) to the head-end node with an indication of the faulty path segment. For instance, for illustration, assume that node C detects a failure of its session 610c, due to a failure between node C and node E (e.g., via node D). Node C may then reroute T1 traffic 150 onto its backup tunnel BT1, and may notify head-end node A of the failure, indicating the path from C-D-E as a failed segment.

In response to learning of a failure of a particular tunnel connectivity verification session, the head-end node A may determine the particular failed path segment based on received failure notifications. Illustratively, in response to receiving a single failure notification from a first node (e.g., node C), the head-end node may determine that the failed path segment includes a next-hop node from the node C, i.e., node D (or, more specifically, the link from C to D and/or the node D). Alternatively, in response to receiving a plurality of failure notifications from a plurality of nodes, the head-end node may determine that the failed path segment includes an overlapping segment of tunnel connectivity verification sessions of the plurality of nodes. For example, upon receiving a first failure notification, the head-end node may initiate a timer, such that other notifications may be received prior to reacting. In this manner, the head-end node may compare a plurality of notifications to pin-point the failure's location.

For the purpose of illustration, assume still that node D has failed. The cause of the failure may be limited to a particular network interface 210 (e.g., a line card), or to a cross-connect between the line cards (e.g., bus 250 and/or supporting software processes), as may be appreciated by those skilled in the art. For instance, a network interface (e.g., line card) may still operate, even when backplane support (e.g., a cross-connect) has failed. If the cross-connect has failed on node D, the session 610b from node B to node D may still function (that is, the network interface/line card on node D may operate sufficiently to return the connectivity message 500 to node B). At the same time, however, node C's session 610c may fail as its messages 500 are unable to reach NNHOP node E over tunnel T1 via failed node D. Accordingly, node C sends the only failure notification to the head-end node A, thus pruning node D. Conversely, assume that a network interface 210 of node D (e.g., interconnected with link C-D) has failed (e.g., or that the entire node D has failed). In this instance, session 610b from node B may fail, as well as session 610c of node C. In this case, both nodes B and C transmit notifications to the head-end node A of a failure. Node A may then determine, based on the overlapping path segments (e.g., node B indicates failure of either node C or node D, while node C indicates failure of node D or node E), that node D has failed. (Alternatively, head-end node A may determine this based on having received a response from node C, thus implying node C is operational.)

Notably, in response to detecting a failed connectivity verification session, a node may be configured to wait for a short period of time to determine whether to reroute tunnel traffic from T1 onto its local backup NNHOP tunnel. For instance, where node D has failed, both nodes B and C will detect the failure as described above. As such, each node may wait to determine whether a downstream PathErr message 300 is received from its next-hop neighbor node, and if so, that node (e.g., B) need not reroute the traffic (that is, it knows that its next-hop neighbor node, e.g., C, has the responsibility to reroute the traffic, accordingly.)

Figure 7:
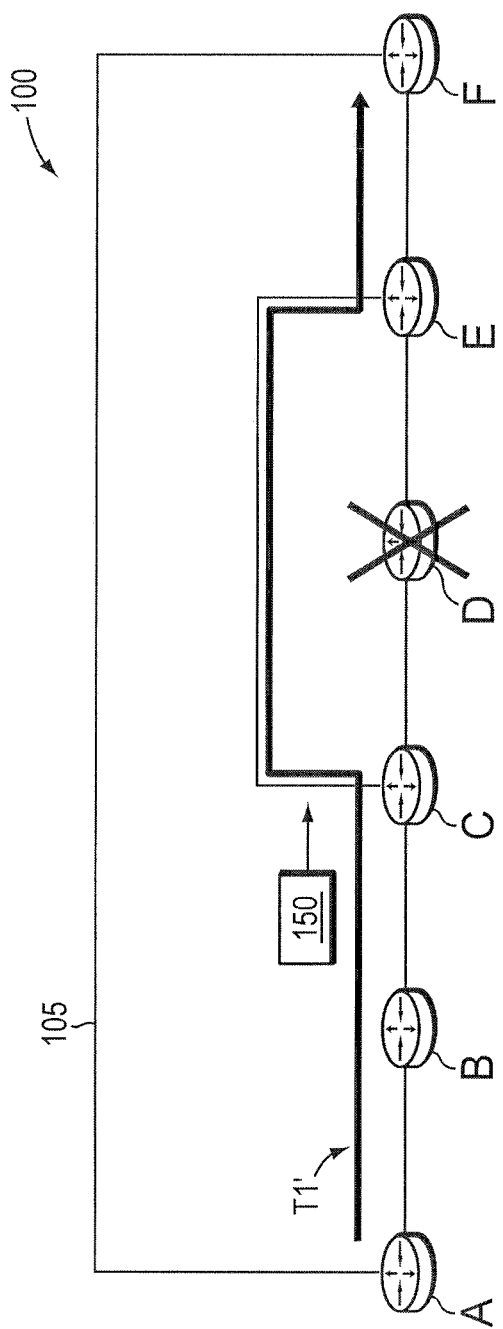
FIG. 7 illustrates an example computer network having a located tunnel failure.

Once the failure location is determined (e.g., node D), the head-end node A may remove node D (and its local links) from its TED 248, and may recompute a new tunnel path excluding the path segment corresponding to the particular failed tunnel connectivity verification session (i.e., the failure location). For instance, FIG. 7 illustrates a newly computed T1' that excludes node D (coincidentally traversing the same path as node C's backup tunnel BT1). In contrast with a single end-to-end BFD session between the head-end node and the tail-end node, upon receiving the failure notification (e.g., Path Error message 300), the head-end node no longer needs to exclude the entire path of the tunnel (A-F) from the TED 248, but instead may exclude a particular path segment (from the node/PLR sending the notification) prior to recomputing the tunnel's new path. Note that while topology convergence (e.g., IGP, BGP, etc.) may eventually lead to discovering the same failed network elements, the tunnel connectivity verification protocol usage described herein allows for rapid failure detection and locating, which is critical for FRR techniques that are designed to be much faster than conventional network convergence.

Figure 8:
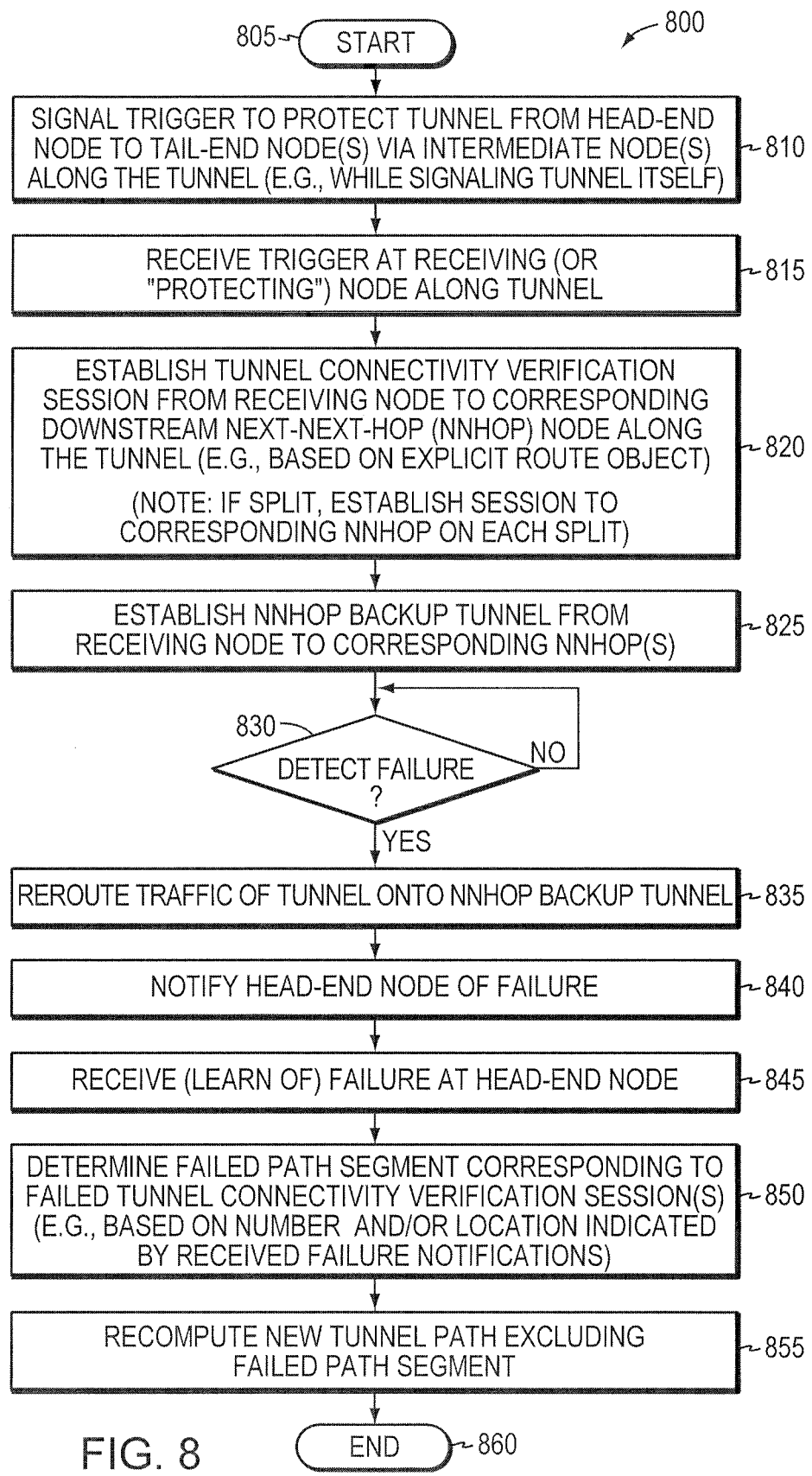
FIG. 8 illustrates an example procedure for locating tunnel failures.

FIG. 8 illustrates an example procedure for locating tunnel failures based on NNHOP connectivity in accordance with one or more embodiments described herein. The procedure 800 starts at step 805, and continues to step 810, where a trigger is signaled to protect a tunnel (e.g., T1) from a head-end node (e.g., node A) to one or more tail-end nodes (e.g., node F) via one or more intermediate nodes (e.g., nodes B-E) along the tunnel. For example, as described above, the trigger may be signaled as part of signaling messages 300 (e.g., TLV 400), or another explicit signal. As each receiving node (or protecting node) along the tunnel receives the trigger in step 815 (e.g., including the head-end node A, but excluding the penultimate hop node E and tail-end node F), those receiving nodes may establish a tunnel connectivity verification session (e.g., BFD session) from itself to a corresponding downstream NNHOP node along the tunnel in step 820. For example, the receiving nodes may determine the NNHOP node based on an ERO in the Path (signaling) message 300. (Notably, as mentioned above, if the tunnel T1 is split at the receiving node, e.g., P2MP tunnels, then a session may be established to a corresponding NNHOP on each split branch.) Further, in step 825, the receiving/protecting nodes may establish NNHOP backup tunnels (e.g., BT1 from node C to node E) in order to provide FRR in the event of a detected failure.

In response to a detected failure of the connectivity verification protocol session in step 830, a node may correspondingly reroute traffic 150 of the tunnel onto the NNHOP backup tunnel in step 835 (e.g., node C detects a failure, and reroutes traffic from T1 onto BT1), and in step 840, notifies the head-end node A of the failure (e.g., in PathErr message 300). In step 845, the head-end node A receives (learns of) the failure, and as described above, may initiate a timer to allow additional failure notifications (if any) to arrive. Based on the number and/or location indicated by the received failure notification(s) (PathErrs 300), the head-end node A may determine a failed path segment (e.g., node D, or links/path C-E) that corresponds to the particular failed tunnel connectivity verification session(s) in step 850, and in step 855 may recompute a new tunnel path excluding the failed path segment (e.g., as seen in FIG. 7). The procedure 800 ends in step 860, having appropriately located the tunnel failure, and also having responded accordingly (that is, without pruning the entire end-to-end tunnel path, A-F)

Advantageously, the novel techniques described herein locates tunnel failures based on NNHOP connectivity in a computer network. By dynamically establishing NNHOP connectivity verification protocol sessions along a tunnel, the novel techniques allow for detection of data forwarding failures and prompt notification to the head-end node in order to perform a traffic reroute based on a particular failed segment of the tunnel. In particular, the techniques described above provide for node protection along a tunnel and allows a head-end node to prune the network topology (its TED) with the appropriate failed path segment without having to wait for the IGP update. Further, the dynamic aspects of one or more embodiments described herein alleviate the need for cumbersome and inefficient manual configuration.

While there have been shown and described illustrative embodiments that locate tunnel failures based on NNHOP connectivity in a computer network, it is to be understood that various other adaptations and modifications may be made within the spirit and scope of the present invention. For example, the embodiments have been shown and described herein with reference to certain protocols and/or relevant message types (e.g., MPLS, RSVP, BFD, etc.). However, the embodiments of the invention in their broader sense are not so limited, and may, in fact, be used with other protocols and messages, such as various tunneling/signaling protocols and connectivity verification protocols that may be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
receiving, at a receiving node located intermediate along a tunnel that extends from a head-end node to one or more tail-end nodes via one or more intermediate nodes in a computer network, a signaled trigger to protect the tunnel;

in response to receiving the signaled trigger to protect the tunnel, utilizing a tunnel connectivity verification protocol at the receiving node to establish a tunnel connectivity verification session, from the receiving node to a corresponding downstream next-next-hop (NNHOP) node, the tunnel connectivity verification session to verify ongoing operation of the tunnel between the receiving node and the corresponding downstream NNHOP node by reoccurring transmission of control packets along the tunnel and detection of a response or non-response to each of the control packets, a non-response to one or more control packets causing failure of the tunnel connective verification session; and in response to a failure of the tunnel connectivity verification session, notifying, by the receiving node, the head-end node of the failure.

2. The method as in claim 1, further comprising:
establishing a NNHOP backup tunnel from the receiving node to its corresponding NNHOP; and
in response to failure of the tunnel connectivity verification session, rerouting traffic of the tunnel onto the NNHOP backup tunnel.

3. The method as in claim 1, further comprising:
signaling the trigger in a tunnel establishment signaling message.

4. The method as in claim 1, further comprising:
determining the corresponding downstream NNHOP node from an explicit route object (ERO) of a tunnel establishment signaling message.

5. The method as in claim 1, further comprising:
determining that the tunnel splits toward a plurality of tail-end nodes at a particular receiving node; and
in response to determining that the tunnel splits toward a plurality of tail-end nodes at a particular receiving node, utilizing the tunnel connectivity verification protocol at the particular receiving node to establish a tunnel connectivity verification session from the particular receiving node to a corresponding NNHOP on each split toward a corresponding tail-end node.

6. The method as in claim 1, wherein the tail-end node does not establish a downstream tunnel connectivity verification session.

7. The method as in claim 1, wherein a penultimate hop node of the tunnel does not establish a downstream tunnel connectivity verification session.

8. The method as in claim 1, wherein the tunnel connectivity verification protocol is a bi-directional forwarding detection (BFD) protocol and the tunnel connectivity verification session is a BFD session.

9. The method as in claim 1, wherein the tunnel is a Multi-Protocol Label Switching Traffic Engineering Label Switched Path (MPLS-TE LSP).

10. A method, comprising:
signaling, from a head-end node of a tunnel to one or more tail-end nodes of the tunnel via one or more intermediate nodes in a computer network, a trigger to protect the tunnel at receiving nodes located intermediate along the tunnel, the trigger to indicate each receiving node is to use a tunnel connectivity verification protocol to establish a tunnel connectivity verification session, from each receiving node to a corresponding downstream next-next-hop (NNHOP) node, the tunnel connectivity verification session used by each receiving node to verify ongoing operation of the tunnel between the respective receiving node and the corresponding downstream NNHOP node by reoccurring transmission of control packets along the tunnel and detection of a response or non-response to each of the control packets, a non-response to one or more control packets causing failure of that tunnel connective verification session; and establishing a tunnel connectivity verification session, from the head-end node to a corresponding downstream NNHOP node, the tunnel connectivity verification session from the head-end node to verify ongoing operation of the tunnel between the head-end node and the corresponding downstream NNHOP node of the head-end node by reoccurring transmission of control packets along the tunnel and detection of a response or non-response to each of the control packets, a non-response to one or more control packets causing failure of that tunnel connective verification session.

11. The method as in claim 10, further comprising:
in response to learning of a failure of a particular tunnel connectivity verification session, recomputing, by the head-end node, a new tunnel path excluding a path segment corresponding to the particular failed tunnel connectivity verification session.

12. The method as in claim 11, further comprising:
determining the path segment based on received failure notifications.

13. The method as in claim 12, further comprising:
in response to receiving a single failure notification from a first node, determining that the path segment includes a next-hop node from the first node; and
in response to receiving a plurality of failure notifications from a plurality of nodes, determining that the path segment includes an overlapping segment of tunnel connectivity verification sessions of the plurality of nodes.

14. An apparatus, comprising:
one or more network interfaces;
a processor coupled to the network interfaces and adapted to execute one or more processes; and
a memory adapted to store a tunnel protection process executable by the processor, the tunnel protection process when executed operable to
receive a trigger to protect a tunnel that extends from a head-end node to one or more tail-end nodes in a computer network, in response to receipt of the trigger to protect the tunnel, utilize a tunnel connectivity verification protocol to establish a tunnel connectivity verification session, from the apparatus to a corresponding downstream next-next-hop (NNHOP) node, the tunnel connectivity verification session to verify ongoing operation of the tunnel between the receiving node and the corresponding downstream NNHOP node by reoccurring transmission of control packets along the tunnel, and detection of a response or non-response to each of the control packets, a non-response to one or more control packets causing failure of the tunnel connective verification session, and
in response to a failure of the tunnel connectivity verification session, notify the head-end node of the failure.

15. The apparatus as in claim 14, wherein the tunnel protection process is further operable to:
establish a NNHOP backup tunnel from the apparatus to its corresponding NNHOP; and
in response to failure of the tunnel connectivity verification session, reroute traffic of the tunnel onto the NNHOP backup tunnel.

16. The apparatus as in claim 14, wherein the apparatus is the head-end node of the tunnel, and the tunnel protection process is further operable to:

in response to learning of a failure of a particular tunnel connectivity verification session, recompute a new tunnel path excluding a path segment corresponding to the particular failed tunnel connectivity verification session.

17. A method comprising:

sending, from a head-end node of a tunnel to a plurality of receiving nodes located intermediate along the tunnel between the head-end node and a tail-end node of the tunnel, a signaling message that includes a trigger, the trigger to request the plurality of receiving nodes to each establish a tunnel connective verification session from the respective receiving node to a corresponding downstream next-next-hop (NNHOP) node located along the tunnel, the tunnel connective verification session to verify ongoing operation of the tunnel between the respective receiving node and the NNHOP node by reoccurring transmission of control packets along the tunnel and detection of a response or non-response to each of the control packets, a non-response to one or more control packets causing failure of the tunnel connective verification session;

receiving, at the head-end node, from one or more the receiving nodes of the plurality of receiving nodes, one or more notifications of failed tunnel connective verification sessions; and based the received one or more notifications of failed tunnel connective verification sessions, determining a particular failed path segment along the tunnel.

18. The method of claim 17, further comprising:

recomputing a new path for the tunnel that excludes the particular failed path segment.

19. The method of claim 17, wherein the tunnel connective verification session is a bi-directional forwarding detection (BFD) session and the control packets are BFD protocol packets.

20. The method of claim 17, wherein the signaling message is a Resource ReSerVation Protocol (RSVP) message used in tunnel establishment.

21. The method of claim 20, wherein a corresponding downstream next NNHOP node for one or more of the receiving nodes is indicated in an explicit route object (ERO) of the RSVP message.

22. An apparatus comprising:

a network interface;

a processor coupled to the network interfaces and configured to execute one or more processes; and a memory configured to store a head-end node process executable by the processor, the head-end node process when executed operable to cause the network interface to send to a plurality of receiving nodes located intermediate along the tunnel between the apparatus and a tail-end node of the tunnel, a signaling message that includes a trigger, the trigger to request the plurality of receiving nodes to each establish a tunnel connective verification session from the respective receiving node to a corresponding downstream next-next-hop (NNHOP) node located along the tunnel, the tunnel connective verification session to verify ongoing operation of the tunnel between the respective receiving node and the NNHOP node by reoccurring transmission of control packets along the tunnel and detection of a response or non-response to each of the control packets, a non-response to one or more control packets causing failure of the tunnel connective verification session, examine one or more notifications of failed tunnel connective verification sessions received from one or more the receiving nodes of the plurality of receiving nodes, and based the received one or more notifications of failed tunnel connective verification sessions, determine a particular failed path segment along the tunnel.

23. The apparatus of claim 22, wherein the head-end node process when executed is further operable to recompute a new path for the tunnel that excludes the particular failed path segment.

24. The apparatus of claim 22, wherein the tunnel connective verification session is a bi-directional forwarding detection (BFD) session and the control packets are BFD protocol packets.

25. The method of claim 22, wherein the signaling message is a Resource ReSerVation Protocol (RSVP) message used in tunnel establishment.

26. The method of claim 25, wherein a corresponding downstream next NNHOP node for one or more of the receiving nodes is indicated in an explicit route object (ERO) of the RSVP message.

* * * * *